US010550953B2

(12) United States Patent
Ito (10) Patent No.: US 10,550,953 B2
(45) Date of Patent: Feb. 4, 2020

(54) SOLENOID VALVE (71) Applicant: MITSUBISHI ELECTRIC CORPORATION, Tokyo (JP)

(72) Inventor: Yoshinori Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 172 days.

(21) Appl. No.: 15/570,659

(22) PCT Filed: Aug. 13, 2015

(86) PCT No.: PCT/JP2015/072891
§ 371 (c)(1),
(2) Date: Oct. 30, 2017

(87) PCT Pub. No.: WO2017/026069
PCT Pub. Date: Feb. 16, 2017

(65) Prior Publication Data
US 2018/0292013 A1 Oct. 11, 2018

(51) Int. Cl.
*F16K 31/06* (2006.01)
*F02B 37/16* (2006.01)
(52) U.S. Cl.
CPC .......... *F16K 31/0655* (2013.01); *F02B 37/16* (2013.01)

(58) Field of Classification Search
CPC ........ F16K 31/0655; F16K 1/36; F02B 37/16; F02B 37/162; Y02T 10/144
See application file for complete search history.

(56) References Cited

U.S. PATENT DOCUMENTS 8,387,383 B2 * 3/2013 Thiery ............... F02B 37/16
251/129.15
2013/0082199 A1 4/2013 Matsumoto et al.

FOREIGN PATENT DOCUMENTS

| DE | 10 2004 044 439 B4 | 9/2006 |
| JP | 59-108824 A | 6/1984 |
| JP | 7-208631 A | 8/1995 |
| JP | 2013-145041 A | 7/2013 |
| JP | 2014-152885 A | 8/2014 |

OTHER PUBLICATIONS

International Search Report issued in PCT/JP2015/072891 (PCT/ISA210), dated Nov. 17, 2015.

* cited by examiner

*Primary Examiner* — Eric Keasel
(74) *Attorney, Agent, or Firm* — Birch, Stewart, Kolasch & Birch, LLP (57) ABSTRACT By forming a recessed portion (24) in a side surface of a valve element (18), a fluid in internal space (22) escapes to external space (23) via a gap made between the recessed portion (24) and a seal ring (3) during the operation of a solenoid valve. Therefore, a load in a direction of closing the valve element (18) decreases, it becomes easy to open the valve element (18), and the responsivity is improved.

3 Claims, 7 Drawing Sheets

FIG. 8B

SOLENOID VALVE

TECHNICAL FIELD

The present disclosure relates to solenoid valves usable as, for example, an air bypass valve of a turbocharger.

BACKGROUND ART

In an engine system equipped with a turbocharger, an air bypass valve is installed in an air bypass passage connecting an upstream portion and a downstream portion of a compressor, and the air bypass passage is opened by the air bypass valve to return turbocharged air contained in the downstream portion of the compressor to the upstream portion of the compressor. As such air bypass valve, for example, a solenoid valve that drives a valve element by using an electromagnetic force is used (for example, refer to Patent Literature 1).

CITATION LIST

Patent Literature

Patent Literature 1: Japanese Unexamined Patent Application Publication No. 2014-152885

SUMMARY OF INVENTION

Technical Problem

In the solenoid valve described in above-mentioned Patent Literature 1, a piston ring, which is a seal ring, is arranged in a piston recessed groove provided in a piston in a cylinder. Because an outer edge portion of the piston ring and an inner circumference surface of the cylinder are in contact with each other and rub against each other at all times when the piston ring reciprocates together with the piston, sliding resistance occurs between the outer edge portion and the inner circumference surface.

A problem is that when the sealing member and a slide counterpart against which the sealing member slides during the operation of the solenoid valve are in contact with each other at all times during the operation of the solenoid valve, the responsivity degrades due to the sliding resistance. A further problem is that respective contact surfaces of the sealing member and the slide counterpart which are in contact with each other are easily worn away.

Embodiments of this disclosure have been made in order to solve the above-mentioned problems. An object of some of the embodiments is to improve the responsivity of a solenoid valve, and reduce wear amounts of respective contact surfaces of a sealing member and a slide counterpart which are in contact with each other.

Solution to Problem

According to the present disclosure, there is provided a solenoid valve including: a casing having an opening; a valve element configured to perform reciprocating motion along in and out directions from the opening; a communicating hole through which an inside and an outside of the casing communicate, the communicating hole being formed in the valve element; a solenoid part for generating an electromagnetic force causing the valve element to move in one direction of the reciprocating motion; a spring for generating an energizing force causing the valve element to move in the other direction of the reciprocating motion; a seal ring fixed to an inner surface of the casing, for filling a gap between the casing and a side surface of the valve element at least when the valve element is located at either end of a range of the reciprocating motion; and a recessed portion formed in the side surface of the valve element, for providing a gap between the recessed portion and the seal ring when the valve element falls within the range of the reciprocating motion.

Advantageous Effects of Invention

According to the present disclosure, because the recessed portion is formed in the side surface of the valve element, a fluid inside the casing escapes to the outside of the casing via the gap provided between the recessed portion and the seal ring during the operation of the valve element. Therefore, a load in a direction of closing the valve element decreases, it becomes easy to open the valve element, and the responsivity can be improved. Further, because surfaces of the side surface of the valve element and the seal ring which are in contact with each other are reduced, the wear amounts thereof can be reduced.

BRIEF DESCRIPTION OF DRAWINGS

FIG. 4 illustrates views explaining a method of operating the solenoid valve according to Embodiment 1, wherein

FIG. 5 illustrates views explaining an effect produced by a recessed portion formed in a side surface of a valve element in Embodiment 1, wherein

FIG. 6 illustrates enlarged views of a seal ring of the solenoid valve according to Embodiment 1 and its surroundings, wherein

DESCRIPTION OF EMBODIMENTS

Hereafter, in order to explain this disclosure in greater detail, embodiments of this disclosure will be described with reference to the accompanying drawings.

Embodiment 1

Figure 1:
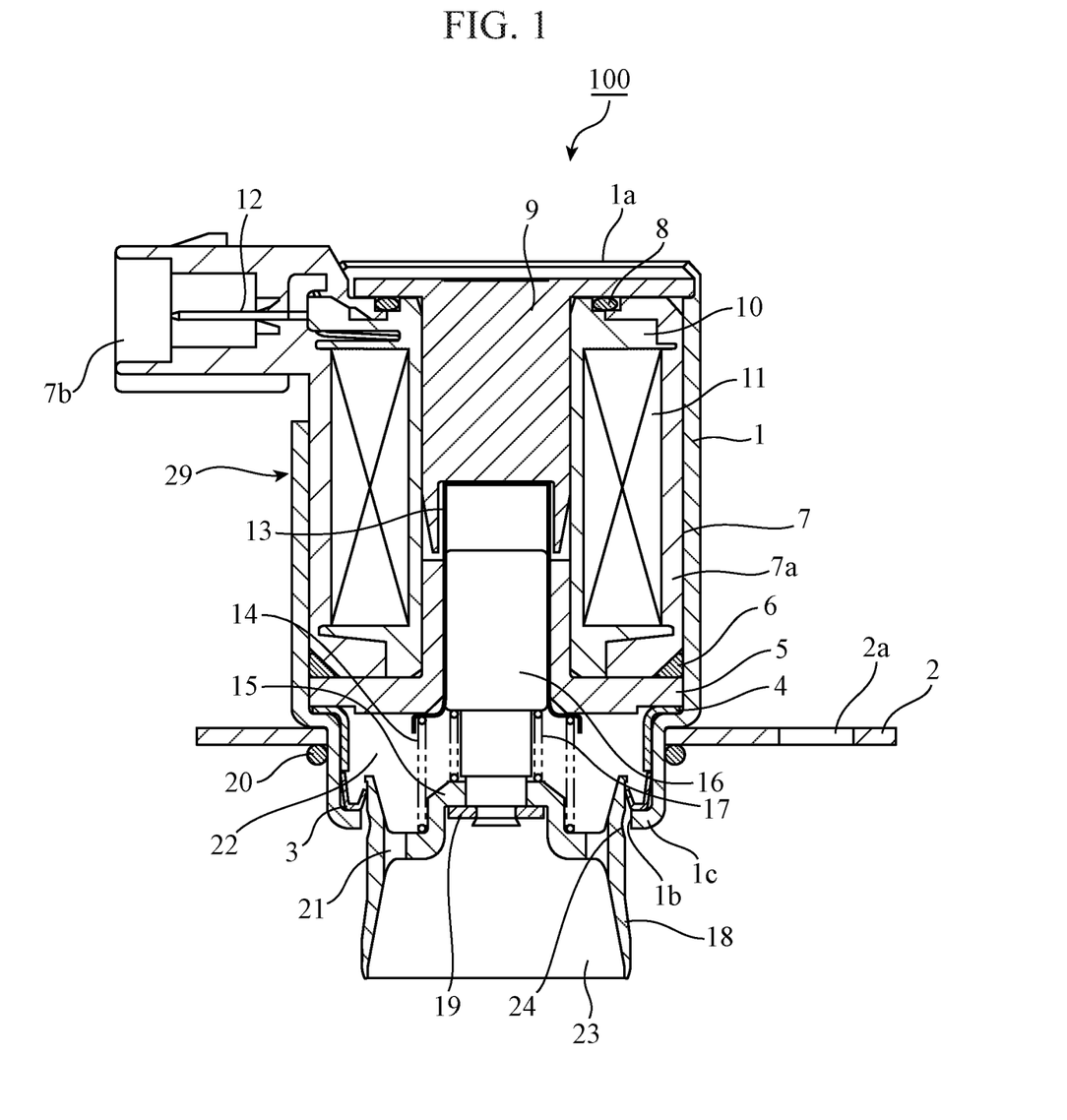
FIG. 1 is a cross-sectional view illustrating an exemplary structure of a solenoid valve according to Embodiment 1 of this disclosure.

FIG. 1 is a cross-sectional view illustrating an exemplary structure of a solenoid valve 100 according to Embodiment 1 of this disclosure. In the solenoid valve 100, a bracket 2 is fixed by welding to an outer circumferential surface of cylindrical casing 1. Further, a seal ring 3, a holder 4, a plate 5, an O ring 6, a coil ASSY 7, an O ring 8, and a core 9 are inserted from an opening 1a of the casing 1 into the inside in this order, and the opening 1a is swaged. As a result, the internal components are held in the casing 1, and the opening 1a of the casing 1 is closed. Further, in another opening 1b of the casing 1, a projecting portion 1c which is shaped so as to project toward the inside is formed. The seal ring 3 having a substantially V-shaped cross section is mounted on the projecting portion 1c, and is held by the holder 4.

The coil ASSY 7 is constructed by winding a coil 11 around a bobbin 10, after that, connecting the coil 11 and a terminal 12 by fusing, covering these bobbin 10, coil 11, and terminal 12 with a sheath resin 7a, and shaping the sheath resin. Further, by shaping the sheath resin 7a, a connector 7b to be connected to a vehicle is formed. The coil 11, the core 9, and a plunger 16 construct a solenoid part 29.

After the opening 1a of the casing 1 is swaged, a pipe 13, a spring 14, and a valve ASSY 15 are inserted into the inside in this order from the opening 1b of the casing 1. A spring 17, a valve element 18, and a washer 19 are put in around an end portion of the plunger 16 in this order, and the end of the end portion of the plunger 16 is swaged, so that the valve ASSY 15 is held.

After that, an O ring 20 for ensuring the airtightness between the solenoid valve and a vehicle is mounted on an outer circumferential of the casing 1, and the solenoid valve 100 is then completed. The solenoid valve 100 in which the assembly of all the components is completed is fixed to the vehicle by using after-mentioned screws 30 which are passed through screw holes 2a of the bracket 2. Further, the airtightness between the solenoid valve 100 and the vehicle is ensured by the O ring 20. Further, a connector of the vehicle and the connector 7b of the solenoid valve 100 are connected to each other.

As a result, the opening 1a of the cylindrical casing 1 is closed, for example, by the plate 5, so that internal space 22 is formed. In the valve element 18 that separates the internal space 22 of the casing 1 and external space 23, a communicating hole 21 through which the internal space 22 and the external space 23 communicate is formed. Further, in a side surface of the valve element 18, the side surface being opposite to the seal ring 3, a recessed portion 24 is formed. This recessed portion 24 may be provided around an entire perimeter of the side surface of the valve element 18 like a continuous ring, or may be shaped discontinuously.

Next, an exemplary usage of the solenoid valve 100 according to Embodiment 1 will be explained with reference to FIGS. 2 and 3.

Figure 2:
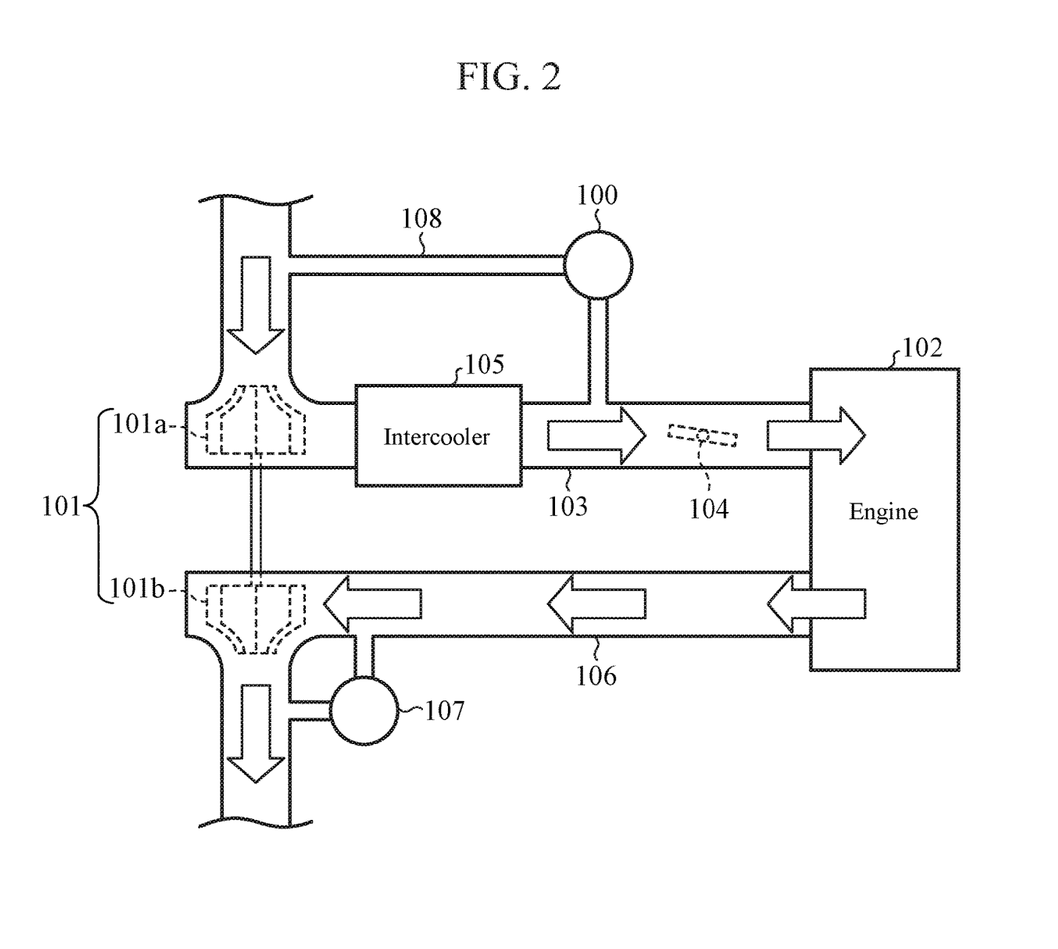
FIG. 2 is a diagram showing a structure of an engine system equipped with a turbocharger and with the solenoid valve according to Embodiment 1, and shows a state at a time when an accelerator is in an ON state.
Figure 3:
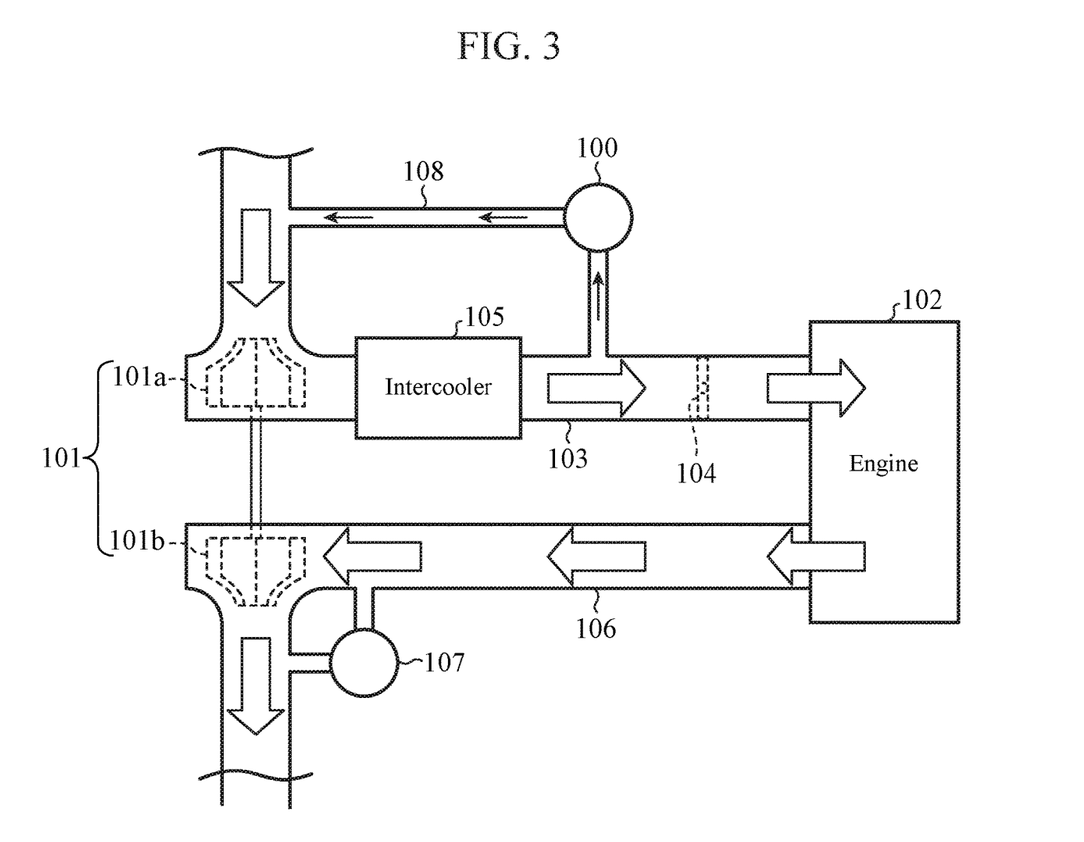
FIG. 3 is a diagram showing a structure of the engine system with the turbocharger and with the solenoid valve according to Embodiment 1, and shows a state at a time when the accelerator is in an OFF state.

In an engine system equipped with a turbocharger as shown in FIGS. 2 and 3, the solenoid valve 100 shown in FIG. 1 is fixed to an air bypass passage 108 connecting an upstream portion and a downstream portion of a compressor 101a of a turbocharger 101, and the solenoid valve 100 is used as an air bypass valve of electronic control type. Hereafter, the solenoid valve 100 shown in FIG. 1 is referred to as the air bypass valve 100.

At a time when an accelerator is in an ON state, as shown in FIG. 2, a throttle valve 104 in a suction passage 103 is open, and air compressed by the compressor 101a of the turbocharger 101 (referred to as turbocharged air from here on) flows through an intercooler 105 and is conveyed to the engine 102. At this time, the air bypass valve 100 is closed.

A turbine 101b is fixed on the same axis as this compressor 101a, and exhaust gas of the engine 102 flows through an exhaust passage 106, thereby rotating the turbine 101b, so that the compressor 101a also rotates. Further, in the exhaust passage 106, a waste gate valve 107 for adjusting the pressure of the exhaust gas is mounted.

At a time when the accelerator is in an OFF state, as shown in FIG. 3, the throttle valve 104 is closed and the turbocharged air collects in the suction passage 103. Because there is a possibility that when the turbocharged air collects, the turbocharger 101, the engine 102, a pipe of the suction passage 103, and so on are broken, the air bypass valve 100 is opened to cause the air bypass passages 108 to communicate, so that the turbocharged air is made to escape from the downstream portion to the upstream portion of the compressor 101a.

Next, a method of operating the air bypass valve 100, i.e., the solenoid valve 100 according to Embodiment 1 will be explained with reference to FIGS. 4A and 4B.

Figure 4A:
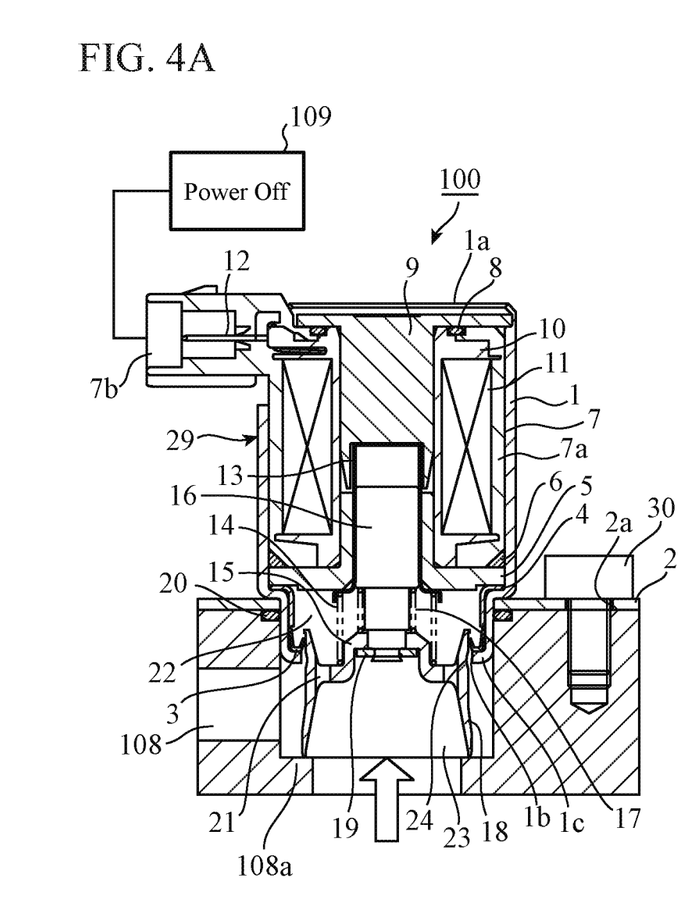
FIG. 4A shows a fully closed state and FIG. 4B shows a fully opened state.
Figure 4B:
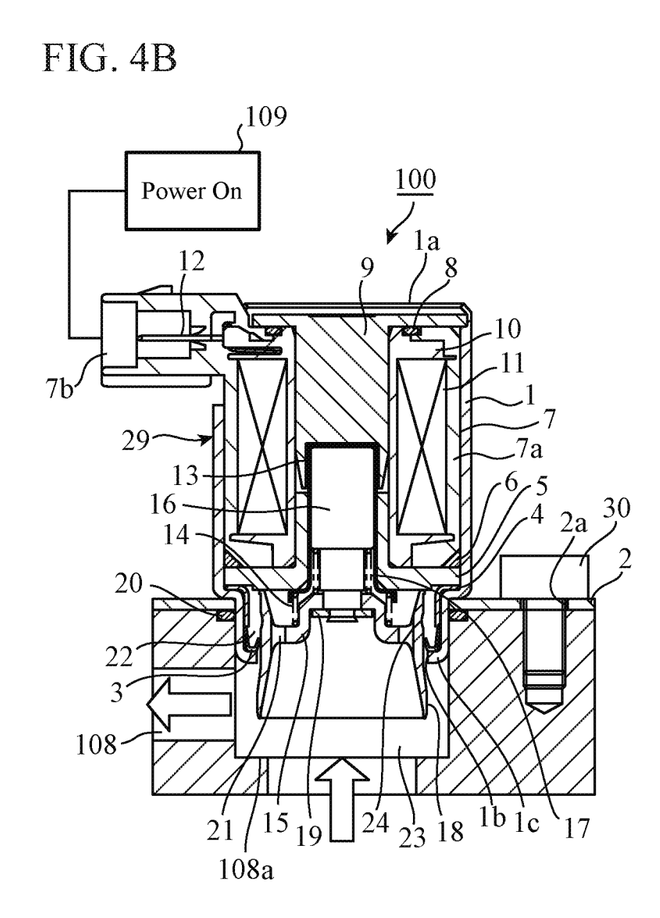

As shown in FIGS. 4A and 4B, the air bypass valve 100 is fixed to a pipe of an air bypass passage 108 of a vehicle with screws 30. Further, a power supply 109 of the vehicle is connected to the connector 7b of the air bypass valve 100. A part of the pipe of the air bypass passage 108 serves as a valve seat 108a. FIG. 4A shows a fully closed state of the air bypass valve 100, and FIG. 4B shows a fully opened state of the air bypass valve 100.

At a time when the power supply 109 is in an OFF state, the valve ASSY 15 is pressed by the spring 14 and the valve element 18 is held in a state in which the valve element is pressed against the valve seat 108a, and the air bypass passage 108 is closed, as shown in FIG. 4A.

Incidentally, the spring 17 is a component for holding the valve element 18 in a state in which the valve element is pressed against the washer 19, in order to prevent looseness from occurring between the plunger 16 and the valve element 18.

At a time when the power supply 109 is in an ON state, a current flows into the coil 11 via the terminal 12, the inside of the coil ASSY 7 functions as an electromagnet to generate an electromagnetic force, and the plunger 16 is attracted toward the core 9, as shown in FIG. 4B. When the plunger 16 moves toward the core 9 while being guided by the pipe 13, the valve ASSY 15 fixed to this plunger 16 operates and the valve element 18 moves away from the valve seat 108a, so that the turbocharged air is made to escape to the upstream portion of the compressor 101a.

Thus, the valve element 18 reciprocates in directions in which the valve element moves from the opening 1b to the casing 1 and vice versa, so that the air bypass passage 108 is opened and closed.

When the valve element 18 is located at either end of a reciprocation range, i.e., when the air bypass valve 100 is fully closed or fully opened, the turbocharged air goes into the internal space 22 via the communicating hole 21, and presses the seal ring 3. As a result, the seal ring 3 comes into contact with both an inner circumferential surface of the casing 1 and the side surface of the valve element 18 without any gap, so that air leakage from any gap between the casing 1 and the valve element 18 can be prevented.

Figure 5A:
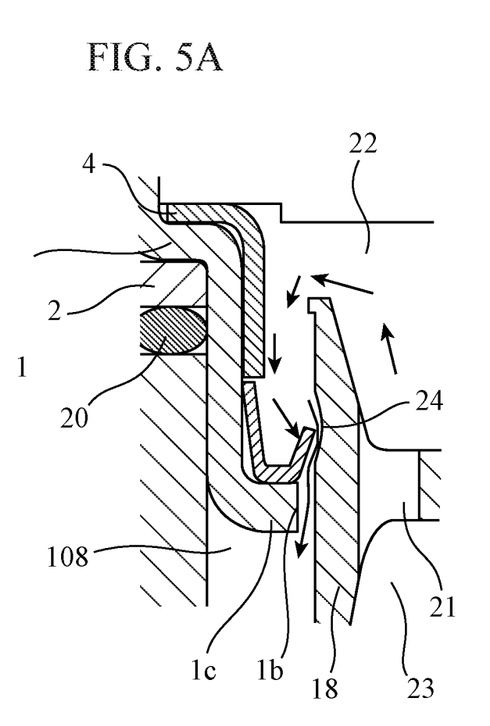
FIG. 5A is an enlarged view of the solenoid valve according to Embodiment 1 and FIG. 5B is an enlarged view of a comparison example for aiding the understanding of Embodiment 1.
Figure 5B:
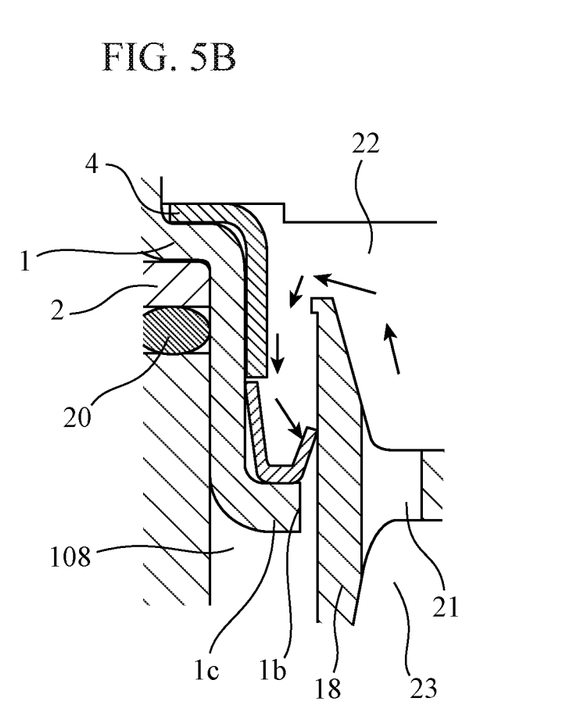

FIGS. 5A and 5B illustrate a view explaining an effect produced by the recessed portion 24 formed in the side surface of the valve element 18 in Embodiment 1. FIG. 5A is an enlarged view of the seal ring 3 of the air bypass valve 100 and surroundings of the seal ring 3 according to Embodiment 1, and FIG. 5B is an enlarged view of a comparison example for aiding the understanding of Embodiment 1. The comparison example shown in FIG. 5B has the same structure as the air bypass valve 100 according to Embodiment 1, with the exception that no recessed portion 24 is formed in a valve element 18.

Figure 6A:
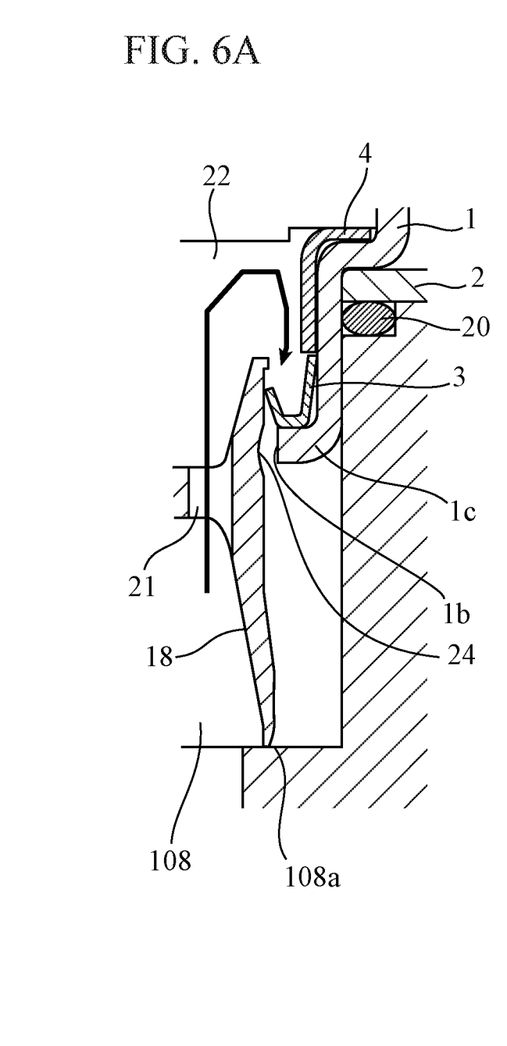
FIG. 6A shows a fully closed state.
Figure 6B:
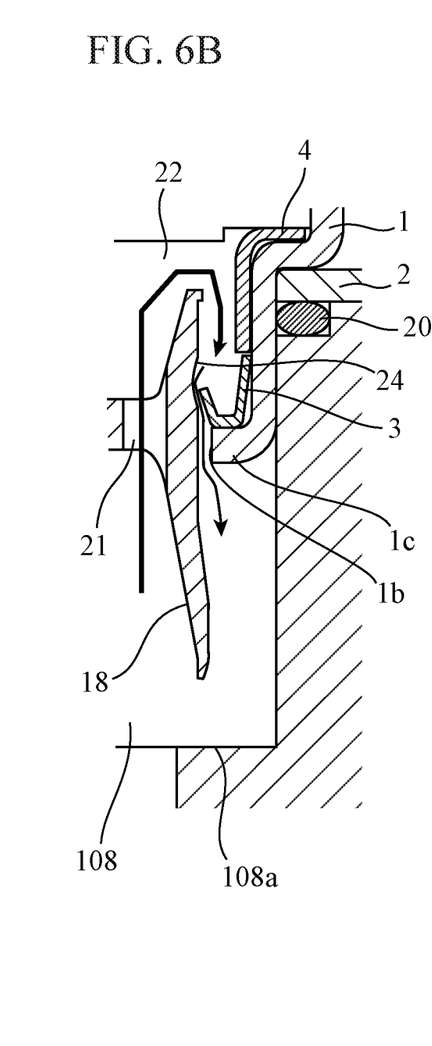
FIG. 6B shows an opened or closed state.
Figure 6C:
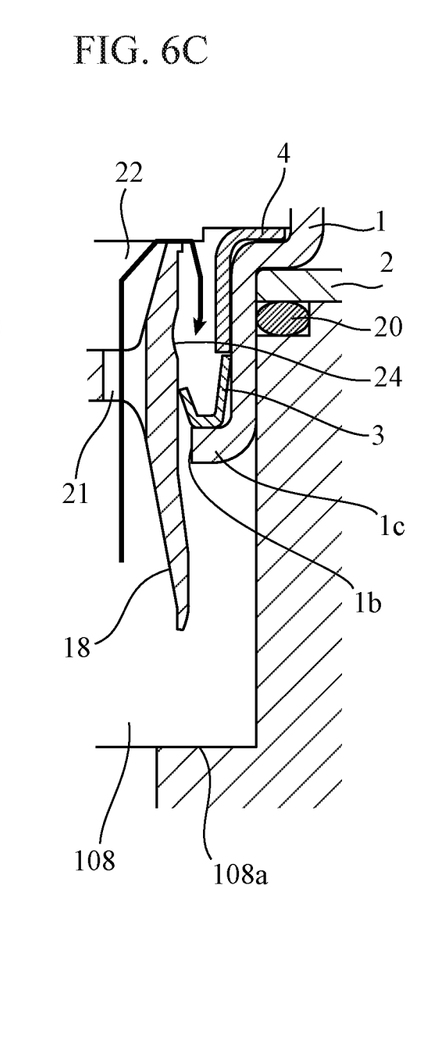
FIG. 6C shows a fully opened state.

FIGS. 6A-6C are an enlarged view of the seal ring 3 of the air bypass valve 100 according to Embodiment 1 and its surroundings, wherein FIG. 6A shows a fully closed state of the valve element 18, FIG. 6B shows a state in which the valve element 18 is being opened or closed, and FIG. 6C shows a fully opened state.

The air bypass valve 100 according to Embodiment 1 and the air bypass valve 100 according to the comparison example have a pressure balancing structure.

In the comparison example shown in FIG. 5B, because the valve element 18 and a seal ring 3 are in contact with each other at all times regardless of the position of the valve element 18 reciprocating, the pressure of internal space 22 and the pressure of external space 23 become equal, and the pressure receiving area of a lower surface of the valve element 18 on a side of the external space 23 and the pressure receiving area of an upper surface of the valve element 18 on a side of the internal space 22 do not change at all times. Therefore, when an electromagnetic force generated by a solenoid part 29 becomes larger than the energizing force of a spring 14 pressing the valve element 18 against a valve seat 108a, the valve element 18 moves in a valve opening direction. In contrast, when the electromagnetic force generated by the solenoid part 29 becomes smaller than the energizing force of the spring 14, the valve element 18 moves in a valve closing direction.

In contrast with this, in the air bypass valve 100 according to Embodiment 1, although when the valve element 18 is located at either end of the reciprocation range, the valve element 18 and the seal ring 3 are in contact with each other at all times, as shown in FIGS. 6A and 6C, when the valve element 18 has moved in the valve opening direction or the valve closing direction, and the valve element 18 is located at a position except both ends of the reciprocation range, i.e., falls within the reciprocation range, the valve element 18 and the seal ring 3 are not in contact with each other at a position where the recessed portion 24 is opposite to the seal ring 3, and a gap is made by the recessed portion 24, as shown in FIGS. 5A and 6B. Because air escapes, via this gap, from the internal space 22 to the external space 23, the pressure of the internal space 22 decreases and a load in the direction of closing the valve element 18 decreases. Therefore, a load in the direction of opening the valve element 18 becomes large relatively, it becomes easy to open the valve element 18, and the responsivity is improved.

The load in the direction of opening the valve element 18 can be adjusted by the size of the gap between the recessed portion 24 and the seal ring 3.

The seal ring 3 is made from a material having flexibility, such as a fluorine resin. It is assumed that while this seal ring 3 is pressed by the turbocharged air flowing from the external space 23, via the communicating hole 21, into the internal space 22, and is then bent to such an extent that the seal ring is in contact with the side surface of the valve element 18, the seal ring is not bent so greatly as to enter the recessed portion 24 of the valve element 18 and come into contact with a bottom surface of the recessed portion 24, but is bent to such an extent that a gap remains.

Further, because the recessed portion 24 is formed in the side surface of the valve element 18 in the air bypass valve 100 according to Embodiment 1, as shown in FIG. 5A, surfaces of the valve element 18 and the seal ring 3 which are in contact with each other are reduced to less than that in the comparison example shown in FIG. 5B, and the wear amount of the valve element 18 and the wear amount of the seal ring 3 are reduced.

Next, the characteristics of the electromagnetic force generated by the solenoid part 29 will be explained.

Figure 7:
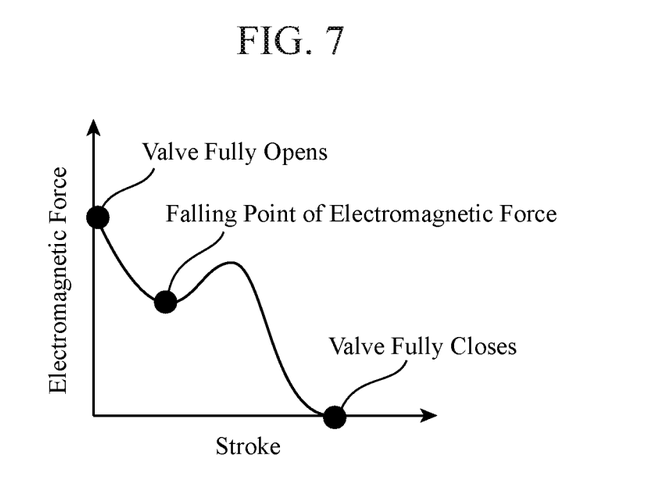
FIG. 7 is a graph showing a change in an electromagnetic force of a solenoid part in Embodiment 1, the change depending on a change in the stroke of the valve element.

FIG. 7 is a graph showing a change in the electromagnetic force generated by the solenoid part 29, the change depending on a change in the stroke of the valve element 18. Because the air gap between the plunger 16 and the core 9 is large as shown in FIG. 4A when the valve element 18 is located at a fully closed position, the electromagnetic force generated in the solenoid part 29 is small. As the valve element 18 moves from the fully closed position to a fully opened position, the electromagnetic force becomes large because the plunger 16 approaches the core 9. When the plunger 16 starts to go into the inside of the core 9, not only a force in the direction of movement from the plunger 16 to the core 9 but also a force in a direction perpendicular to the direction of movement act. As a result, the electromagnetic force temporarily becomes weak, and reaches an electromagnetic force drop point. After that, as the plunger 16 advances to the inside of the core 9, the air gap between the plunger 16 and the core 9 in the direction of movement becomes small, and a large electromagnetic force is generated.

Conventionally, in order to ensure a sufficient valve opening force even if the electromagnetic force temporarily becomes weak when the valve element 18 moves in the valve opening direction, the coil 11 is upsized to generate a large electromagnetic force. In contrast with this, in Embodiment 1, by forming the recessed portion 24 in a portion of the side surface of the valve element 18, the portion being opposite to the seal ring 3 when the valve element 18 is located at a position where the electromagnetic force generated by the solenoid part 29 temporarily becomes weak, air escapes from the internal space 22 to the external space 23 via the gap between the recessed portion 24 and the seal ring 3 and the load in the direction of closing the valve element 18 decreases when the electromagnetic force becomes weak. As a result, it becomes possible to open the valve element 18 by using even a weak electromagnetic force, and it is not necessary to upsize the coil 11, unlike in the casing of conventional solenoid valves, thereby being able to downsize the air bypass valve 100.

Figure 8A:
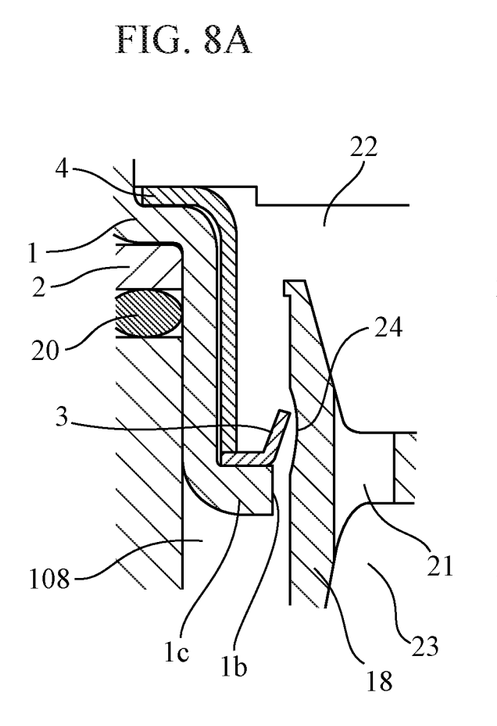
FIGS. 8A and 8B are views each showing a variant of the seal ring of the solenoid valve according to Embodiment 1.
Figure 8B:
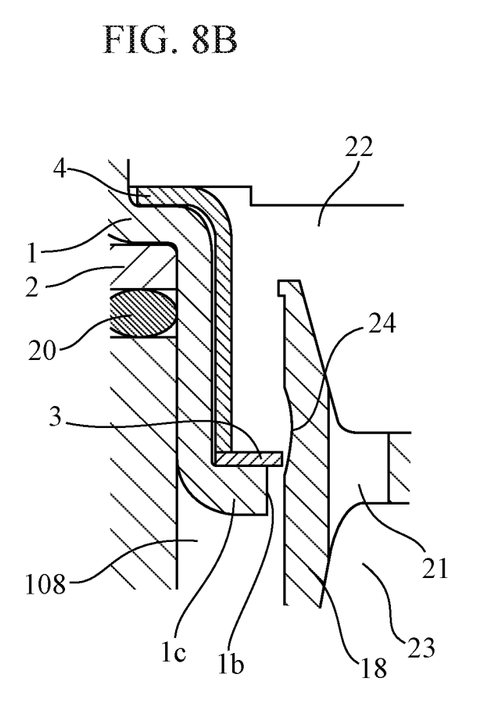

Although in Embodiment 1 the seal ring 3 having an substantially V-shaped cross section is shown as an example, this shape is non-limiting. For example, a seal ring 3 having a substantially L-shaped cross section as shown in FIG. 8A can be alternatively used, or a plate-shaped seal ring 3 as shown in FIG. 8B can be alternatively used.

Further, although in Embodiment 1 the cylindrical valve element 18 is shown as an example, this shape is non-limiting. The valve element may be shaped like a plate. Further, although the example of using the solenoid valve 100 as the air bypass valve 100 is explained, the solenoid valve can be used for other applications.

As explained above, the solenoid valve 100 according to Embodiment 1 is constructed so as to include: the casing 1 having the opening 1b; the valve element 18 reciprocating in the directions in which the valve element moves from the opening 1b to the casing 1 and vice versa; the communicating hole 21 formed in the valve element 18, for communicating between the internal space 22 inside the casing 1, and the external space 23 outside the casing 1; the solenoid part 29 for generating an electromagnetic force causing the valve element 18 to move in one of the reciprocating directions; the spring 14 for generating an energizing force causing the valve element 18 to move in the other one of the reciprocating directions; the seal ring 3 fixed to the inner surface of the casing 1, for filling a gap between the casing 1 and the side surface of the valve element 18 at least when the valve element 18 is located at either end of the reciprocation range; and the recessed portion 24 formed in the side surface of the valve element 18, for making a gap between the recessed portion and the seal ring 3 when the valve element 18 falls within the reciprocation range. According to this structure, the fluid in the internal space 22 escapes to the external space 23 via the gap made between the recessed portion 24 and the seal ring 3 during the operation of the solenoid valve 100, the load in the direction of closing the valve element 18 decreases, it becomes easy to open the valve element 18, and the responsivity can be improved. Further, because the surfaces of the side surface of the valve element 18 and the seal ring 3 which are in contact with each other are reduced, the wear amount of the side surface of the valve element 18 and the wear amount of the seal ring 3 can be reduced.

Further, according to Embodiment 1, the recessed portion 24 is formed in a portion of the side surface of the valve element 18, the portion being opposite to the seal ring 3 when the valve element 18 is located at a position where the electromagnetic force generated by the solenoid part 29 temporarily becomes weak. Therefore, even if the electromagnetic force temporarily becomes weak, the valve element 18 can be opened. Therefore, it is not necessary to upsize the coil 11 of the solenoid part 29, and the solenoid valve 100 can be downsized.

Further, according to Embodiment 1, the solenoid valve 100 is constructed so as to be used as the air bypass valve 100 that is installed in the air bypass passage 108 connecting the upstream portion and the downstream portion of the compressor 101a of the turbocharger 101, and that returns the turbocharged air in the downstream portion of the compressor 101a to the upstream portion of the compressor. Therefore, the air bypass passage 108 can be opened promptly, and the pressure in the downstream portion of the compressor 101a can be released promptly.

Note that various modifications can be made to any component according to the embodiments, or any component according to the embodiments can be omitted within the scope of the invention.

INDUSTRIAL APPLICABILITY

Because the solenoid valve according to the present invention is constructed so as to improve the responsivity, the solenoid valve is suitable for use as an air bypass valve of a turbocharger, for example.

REFERENCE SIGNS LIST 1 casing; 1a, 1b opening; 1c projecting portion; 2 bracket; 2a screw hole; 3 seal ring; 4 holder; 5 plate; 6 O ring; 7 coil ASSY; 7a sheath resin; 7b connector; 8 O ring; 9 core; 10 bobbin; 11 coil; 12 terminal; 13 pipe; 14 spring; 15 valve ASSY; 16 plunger; 17 spring; 18 valve element; 19 washer; 20 O ring; 21 communicating hole; 22 internal space; 23 external space; 24 recessed portion; 29 solenoid part; 30 screw; 100 air bypass valve (solenoid valve); 101 turbocharger; 101a compressor; 101b turbine; 102 engine; 103 suction passage; 104 throttle valve; 105 intercooler; 106 exhaust passage; 107 waste gate valve; 108 air bypass passage; 108a valve seat; and 109 power supply.

The invention claimed is:
1. A solenoid valve comprising:
a casing;
a valve element configured to perform reciprocating motion in first and second directions opposite to each other;
a communicating hole through which an inside and an outside of the casing communicate, the communicating hole being formed in the valve element;
a solenoid part for generating an electromagnetic force causing the valve element to move in the first direction of the reciprocating motion;
a spring for generating an energizing force causing the valve element to move in the second direction of the reciprocating motion; and
a seal ring fixed to an inner surface of the casing, wherein
when the valve element is located at each end of a range defined by the reciprocating motion, the seal ring fills a gap between the casing and a side surface of the valve element,
a recessed portion is formed as part of the side surface of the valve element so as to occupy part of the range defined by the reciprocating motion,
when the seal ring faces the recessed portion, the seal ring fails to fill the gap between the casing and the side surface of the valve element.
2. The solenoid valve according to claim 1, wherein the recessed portion is formed in a portion of the side surface of the valve element, the portion being opposite to the seal ring when the valve element is located at a position where the electromagnetic force generated by the solenoid part temporarily becomes weak.
3. The solenoid valve according to claim 1, wherein the solenoid valve is used as an air bypass valve that is installed in an air bypass passage connecting an upstream portion and a downstream portion of a compressor of a turbocharger, and that returns turbocharged air in the downstream portion of the compressor to the upstream portion of the compressor.

* * * * *